United States Patent

Ebisawa et al.

[11] Patent Number: 6,064,536
[45] Date of Patent: May 16, 2000

[54] APPARATUS FOR RECORDING DATA, APPARATUS FOR REPRODUCING DATA, AND METHOD OF REPRODUCING DATA

[75] Inventors: Kan Ebisawa; Hiroki Nagakita, both of Kanagawa, Japan

[73] Assignee: Sony Corporation, Tokyo, Japan

[21] Appl. No.: 08/909,355

[22] Filed: Aug. 11, 1997

Related U.S. Application Data

[63] Continuation of application No. PCT/JP96/03856, Dec. 27, 1996.

[30] Foreign Application Priority Data

Dec. 27, 1995 [JP] Japan ................................ 7-341497

[51] Int. Cl.⁷ .............................. G11B 5/035; G11B 5/09
[52] U.S. Cl. ............................ 360/65; 360/46; 375/231
[58] Field of Search ............................ 360/96, 65, 48; 375/231

[56] References Cited

U.S. PATENT DOCUMENTS 5,452,279  9/1995  Yokota et al. .......................... 369/54
5,886,844  3/1999  Shimizu .................................. 360/53

FOREIGN PATENT DOCUMENTS 5-314653  11/1993  Japan .
6-267216  9/1994  Japan .
8-7482  1/1996  Japan .

Primary Examiner—Aristotelis M. Psitos
Assistant Examiner—Regina Y. Neal
Attorney, Agent, or Firm—Frommer Lawrence & Haug, LLP.; William S. Frommer; Dennis M. Smid

[57] ABSTRACT

A reproduced signal of a test signal recorded together with data on a recording medium in each unit recording area thereof is equalized in waveform by an adaptive waveform equalizing means while tap coefficients thereof are being varied. The tap coefficients obtained when an equalized signal is as close to an ideally equalized dignal as possible are used as optimum tap coefficients, and the reproduced signals of the data in the unit recording areas are equalized in waveform using the optimum tap coefficients.

The data can be equalized in waveform stably, reliably, and quickly by a small-scale circuit. There is provided an apparatus for reproducing data so as to be able to achieve high-density recording.

10 Claims, 12 Drawing Sheets

F I G. 6
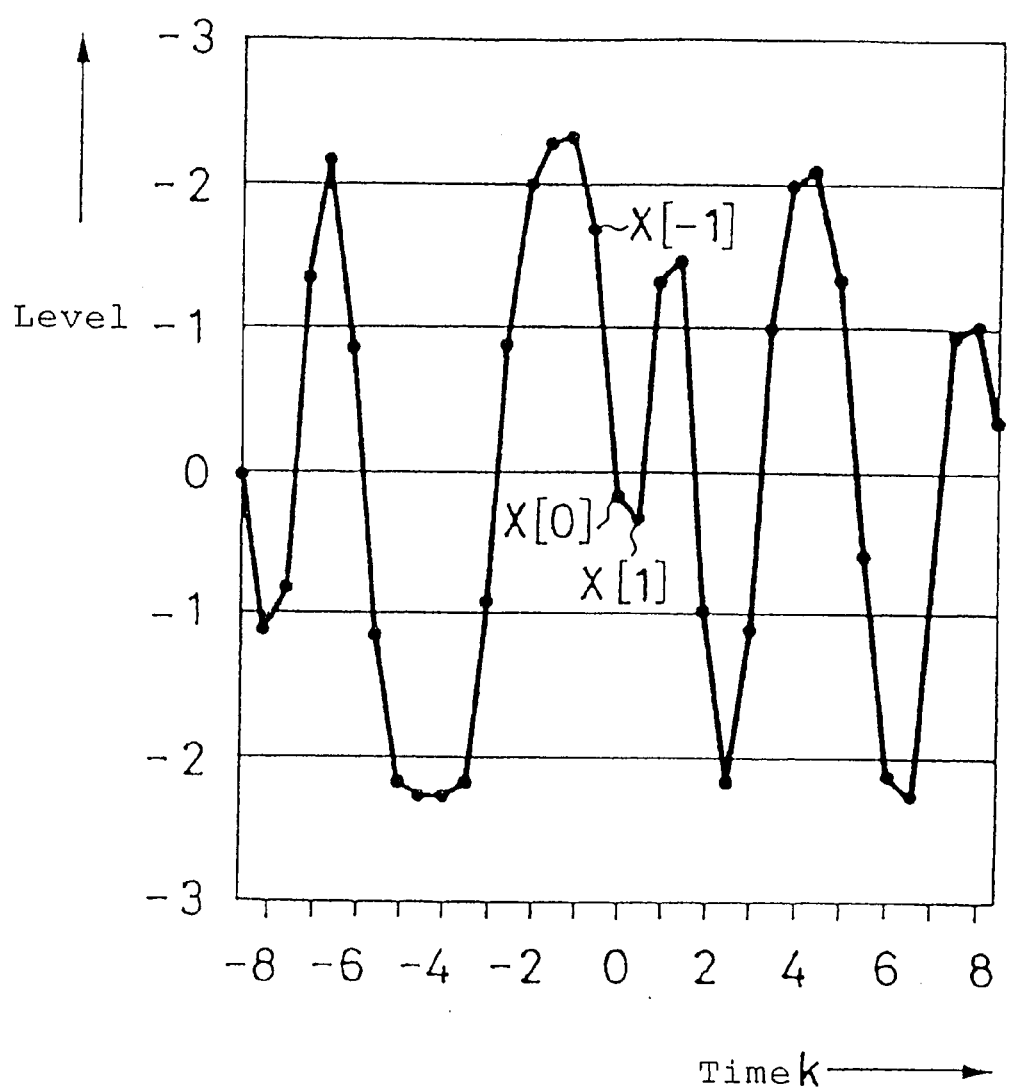

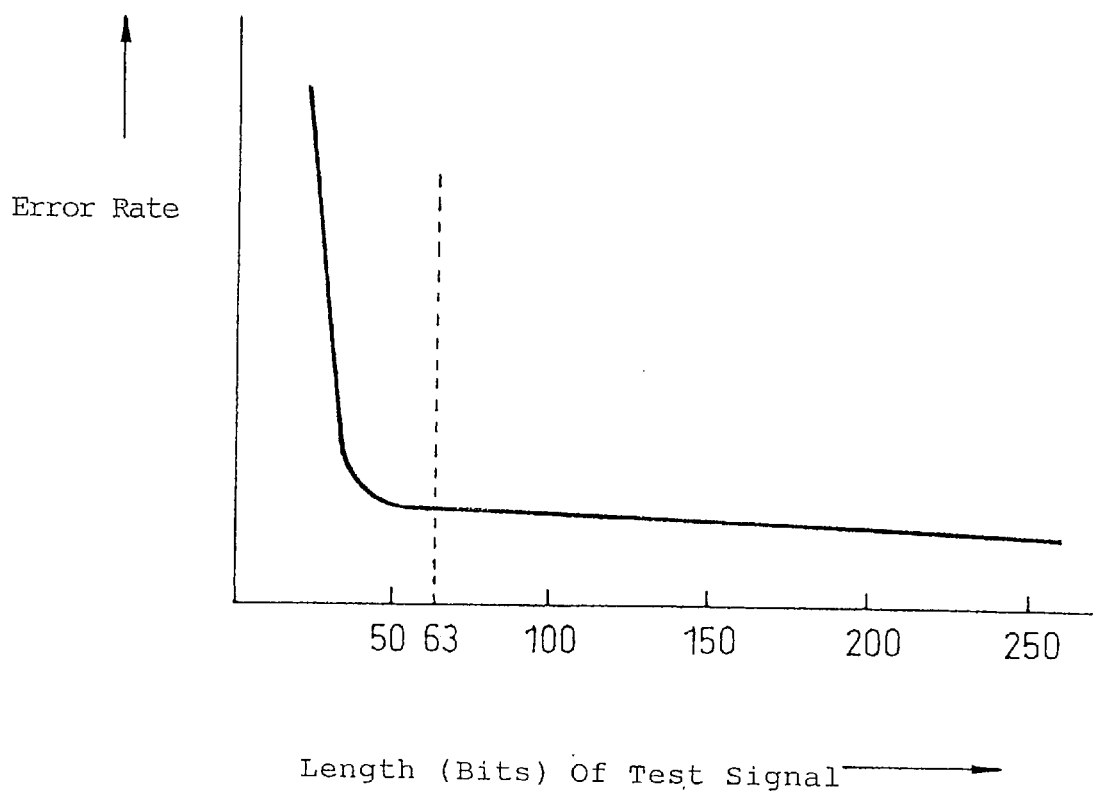

APPARATUS FOR RECORDING DATA, APPARATUS FOR REPRODUCING DATA, AND METHOD OF REPRODUCING DATA

This is a continuation of copending International Application PCT/JP96/03856 having an international filing date of Dec. 27, 1996.

TECHNICAL FIELD

The present invention relates to an apparatus for recording data, an apparatus for reproducing data, an a method of reproducing data.

BACKGROUND ART

Data signal reproduced from disks suffer greater waveform distortions and poorer error rates as the recording density is higher, failing to obtain normal reproduced data. Since data are recorded on and reproduced from disks in each sector (unit recording area), their waveform distortions vary from sector to sector. It has been customary to equalize reproduced data signals with an equalizer having fixed tap coefficients. Therefore, the waveform distortions are smaller in some sectors and greater in other sectors. It is thus necessary to determine optimum tap coefficients for each sector for equalizing reproduced data signals.

One proposal is to store all data of a sector in a memory and then determine optimum tap coefficients for waveform equalization. However, this proposal results in an increase in the delay time and an increase in a circuit scale such as of the memory. According to another proposal, determine optimum tap coefficients for waveform equalization are determined by data in a sector, and are used as determine optimum tap coefficients for waveform equalization for a reproduced data signal in another sector. If, however, the amount of data used to determine the optimum tap coefficients for waveform equalization, then a poorer error rate will result when reproduced data signals are equalized for waveform using the optimum tap coefficients thus determined. Furthermore, if the data used to determine the optimum tap coefficients for waveform equalization contain an error, then when reproduced data are equalized for waveform using the optimum tap coefficients thus determined, the error rate of the reproduced data is increased.

In view of the above problems, the present invention proposes an apparatus for recording data, an apparatus for reproducing data, an a method of reproducing data to effect stable, reliable, and quick waveform equalization of reproduced data signals with a small-scale circuit upon reproduction of data.

DISCLOSURE OF THE INVENTION

According to a first invention, there is provided an apparatus for recording data by recording a management data signal for recording of a data signal in a first area in a unit recording area of a recording medium, and recording the data signal, which has been modulated to make a signal to be recorded on the recording medium suitable for recording on and reproducing from the recording medium, in a second area in the unit recording area of the recording medium, comprising recording signal forming means for forming and outputting, depending on a control signal, a test signal comprising a digital signal of as few bits as possible at an allowable error rate for establishing predetermined waveform equalization characteristics for adaptive waveform equalizing means for effecting waveform equalization on a reproduced signal of the data recorded on the recording medium, and the data signal which has been modulated, following the test signal, recording means for recording an output signal from the recording signal forming means on the recording medium, and control means for generating the control signal to record the test signal in the first area of the recording medium and the data signal in the second area of the recording medium.

According to a second invention, there is provided an apparatus for reproducing data by reproducing, from a recording medium in which a management data signal for recording of an encoded data signal and a test signal for establishing predetermined waveform equalization characteristics for adaptive waveform equalizing means for effecting waveform equalization on a reproduced signal of the encoded data signal are recorded in a first area in a unit recording area, and the encoded data signal is recorded in a second first area in the unit recording area, the test signal and the encoded data signal, and decoding the encoded data signal, comprising signal reproducing means for reproducing the management data signal, the test signal, and the encoded data signal from the recording medium, clock signal forming means for forming a clock signal in synchronism with a binary signal converted from an output signal from the signal reproducing means, A/D converting means for converting the output signal from the signal reproducing means from an analog form into a digital form in response to the clock signal, waveform equalizing means comprising an nth-order transversal filter with tap coefficients established by a coefficient control signal, for effecting waveform equalization on the test signal and the encoded data signal, which are outputted from the signal reproducing means, with waveform equalization characteristics depending on the tap coefficients, in response to the clock signal, ideal waveform-equalized data generating means for generating ideal waveform-equalized data of the test signal in synchronism with an output signal from the A/D converting means, equalization characteristics control means for generating the coefficient control signal in each unit recording area of the recording medium in a period in which the test signal is being inputted to the waveform equalizing means, in response to a control signal, and establishing waveform equalization characteristics for the waveform equalizing means so that an output signal from the waveform equalizing means will be equalized to the ideal waveform-equalized data, decoding means for decoding the encoded data signal outputted from the waveform equalizing means into original data, and system control means for forming the control signal, determining whether the tap coefficients which are finally obtained have respective predetermined values or not, and finishing establishment of the waveform equalization characteristics for the waveform equalizing means if the tap coefficients have the predetermined values.

According to a third invention, there is provided a method of reproducing data by reproducing, from a recording medium in which a management data signal for recording of an encoded data signal and a test signal for establishing predetermined waveform equalization characteristics for adaptive waveform equalizing means for effecting waveform equalization on a reproduced signal of the encoded data signal are recorded in a first area in a unit recording area, and the encoded data signal is recorded in a second first area in the unit recording area, the test signal and the encoded data signal, and decoding the encoded data signal, comprising the steps of reproducing the management data signal, the test signal, and the encoded data signal from the recording medium, forming a clock signal in synchronism with a binary signal converted from an output signal from the signal reproducing means, converting the output signal from the signal reproducing means from an analog form into a digital form in response to the clock signal, effecting, using an nth-order transversal filter with tap coefficients established by a coefficient control signal, waveform equalization on the test signal and the encoded data signal, which are outputted from the signal reproducing means, with waveform equalization characteristics depending on the tap coefficients, in response to the clock signal, generating ideal waveform-equalized data of the test signal in synchronism with a signal produced when the output signal from the signal reproducing means is converted from an analog form into a digital form, generating the coefficient control signal in each unit recording area of the recording medium in a period in which the test signal is being sent to the step of effecting waveform equalization, in response to a control signal, and establishing waveform equalization characteristics for the step of effecting waveform equalization so that an output signal from the step of effecting waveform equalization will be equalized to the ideal waveform-equalized data, decoding the encoded data signal outputted from the step of effecting waveform equalization into original data, and forming the control signal, determining whether the tap coefficients which are finally obtained have respective predetermined values or not, and finishing establishment of the waveform equalization characteristics for the step of effecting waveform equalization if the tap coefficients have the predetermined values.

With the above inventions, a test signal for determining optimum tap coefficients of an adaptive waveform equalizer is recorded together with encoded data in each unit recording area of a recording medium. For reproducing the data from the recording medium, the tap coefficients of the adaptive waveform equalizer are controlled for equalizing waveform-equalized signals of the reproduced test signal to ideally equalized conditions as much as possible until final optimum tap coefficients suitable to the unit recording areas will be established.

BRIEF DESCRIPTION OF THE DRAWINGS:

FIG. 6 is a diagram showing the waveform of an input signal supplied to the waveform equalizer;

FIG. 12 is a diagram showing an error rate of a test signal.

BEST MODE FOR CARRYING OUT THE INVENTION:

An embodiment of the present invention will hereinafter be described with reference to the drawings. The present invention will be described with respect to a magnetooptical disk used as a recording medium. However, the present invention is also applicable to a disk-shaped recording medium such as an optical disk, a magnetic disk, or the like may be used, and a recording medium such as a magnetic tape, a magnetic drum, or the like.

Figure 8:
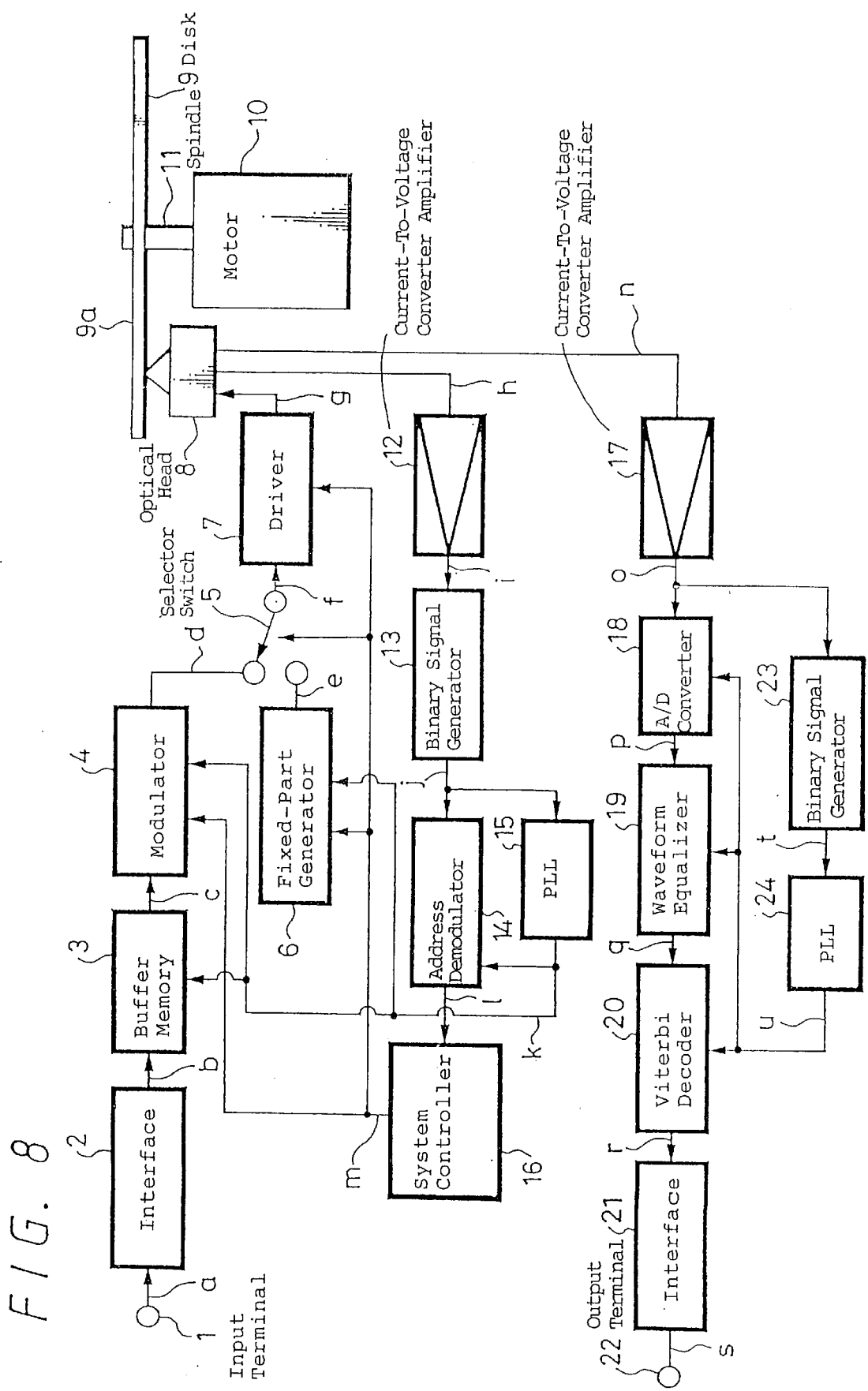
FIG. 8 is a block diagram of a circuit according to the embodiment of the present invention.

A magnetooptical recording and reproducing apparatus which employs a magnetooptical disk will first be described with reference to FIG. 8. A magnetooptical disk 9 having a recording surface 9a is mounted on a spindle 11 that is driven by a motor 10 to rotate at a constant rotational speed. An optical head 8 records signals on and reproduce signals from the magnetooptical disk 9.

Figure 10:
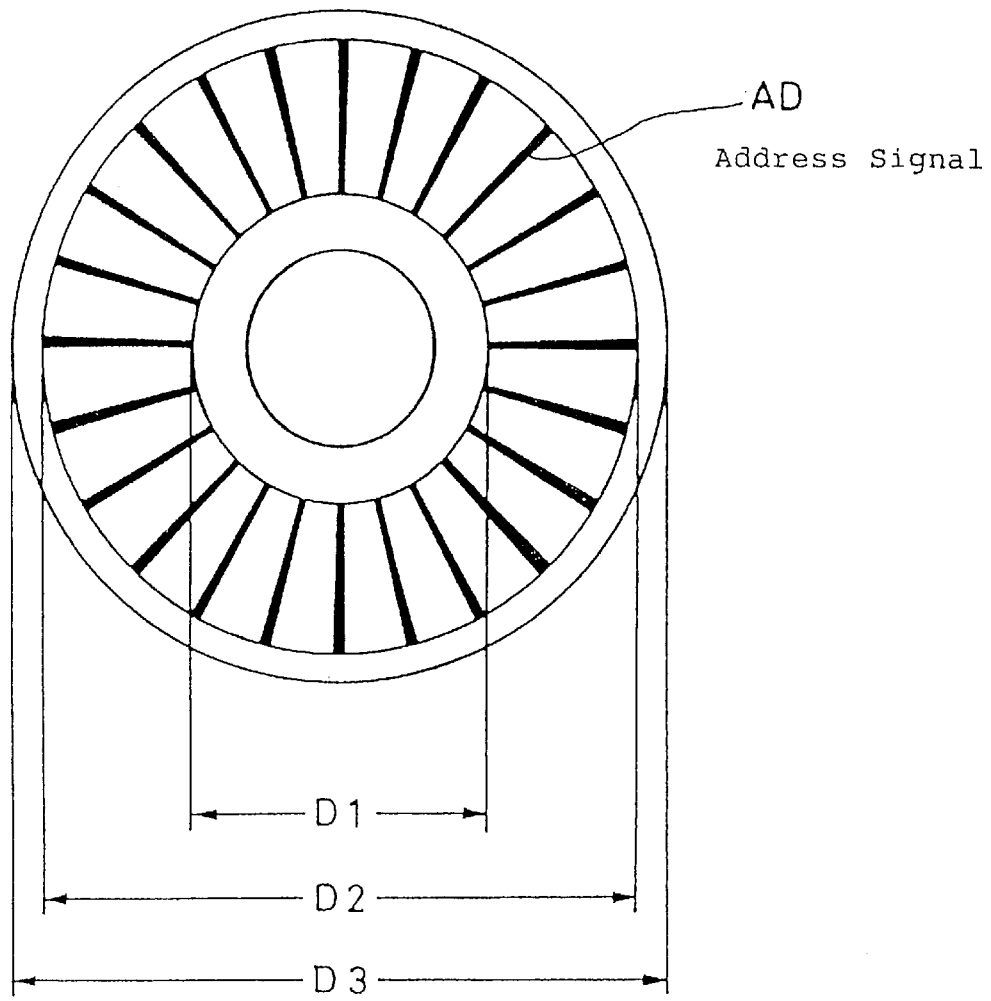
FIG. 10 is a plan view of a disk.

The magnetooptical disk 9 and a format thereof will be described below with reference to FIGS. 10 and 11. As shown in FIG. 10, the recording surface 9a of the magnetooptical disk 9 has 24 radial address signals (modulated address signals) AD, for example, recorded (formed) in advance at equal angular intervals thereon, and also has 24 sectors (unit recording areas) along its circumference which include the address signals AD. The magnetooptical disk 9 has a diameter D3 of 130 mm, and the recording areas have an outside diameter D2 of 120 mm and an inside diameter D1 of 60 mm.

Figure 11:
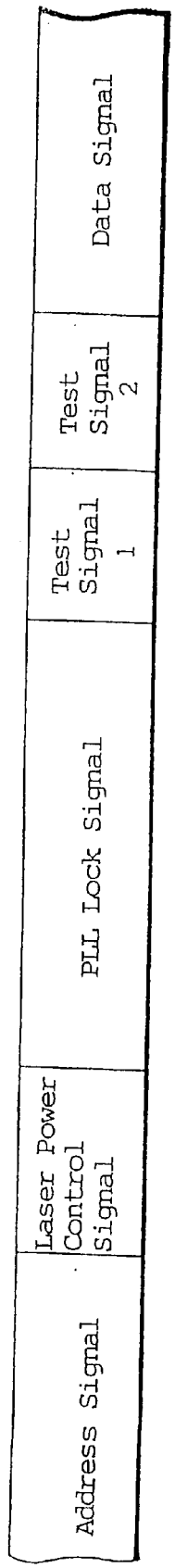
FIG. 11 is a diagram illustrative of a disk format of each sector.

As shown in FIG. 11, the address signal AD in each sector is recorded (formed) in advance on a land between pre-grooves of the recording surface 9a of the magnetooptical disk 9, and an 8-byte laser power control signal for optimally controlling laser power depending on each of recording, erasing, and reproducing modes is recorded (formed) in advance following the address signal AD. Following the laser power control signal, a 24-byte PLL lock signal and waveform equalization test signals 1, 2 each of 8 bytes (64 bits) of the same random data are successively recorded in the recording mode. Although not shown, test number data for identifying test signals is positioned in front of the test signals 1, 2.

FIG. 12 shows the characteristics of an error rate with respect to the length (bits) of the test signals. Specifically, FIG. 12 shows the error rate of reproduced data which is produced when a reproduced data signal is equalized in waveform using a test signal whose bits are represented by the horizontal axis. The characteristic curve indicates that the error rate is low when the length of the test signal is 8 bytes, i.e., 64 bits. However, the error rate becomes abruptly higher (worse) as the length of the test signal is smaller when the length of the test signal is 50 bits or less.

Figure 9:
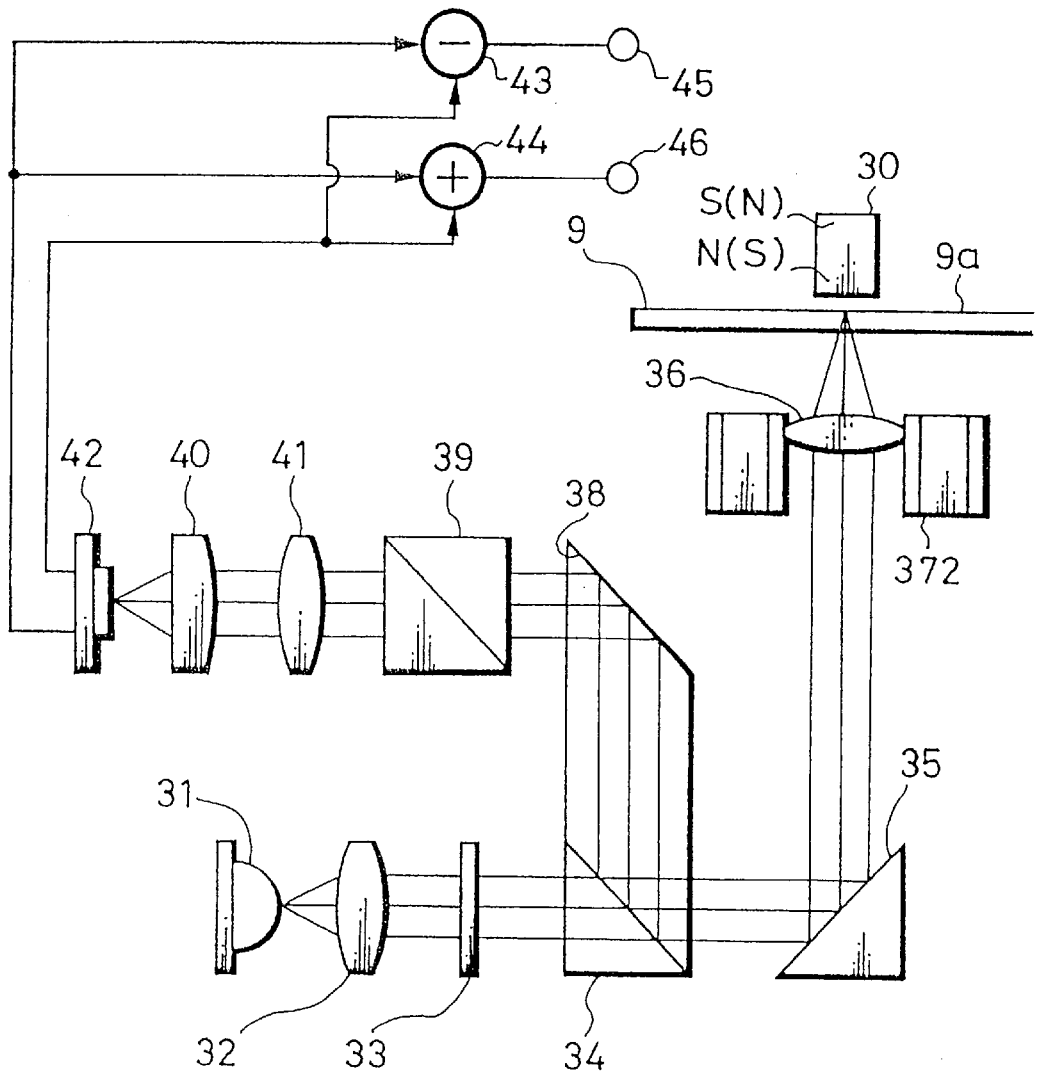
FIG. 9 is a view showing an arrangement of an magnetooptical recording and reproducing apparatus according to the embodiment of the present invention.

An arrangement of the optical head 8 will be described with reference to FIG. 9. The optical head 8 has a magnet (electromagnet or permanent magnet) 30 positioned for applying a magnetic field (which is a DC magnetic field, but may be switched in polarity as shown) substantially perpendicularly to the recording surface 9a which is on the face side of the magnetooptical disk 9. In FIG. 8, the magnet 30 is omitted from illustration. A laser beam from a laser beam source (laser diode) 31 is converted into a parallel light beam when it passes through a collimator lens 32. The parallel light beam passes through a diffraction grating 33 and a beam splitter 34 to a mirror (prism mirror) 35. The parallel light beam from the mirror 35 passes through an objective lens 36, which focuses the parallel light beam onto the recording surface 9a from the back side of the magnetooptical disk 9. A biaxial device 37 serves to effect focusing servo and tracking servo operation on the objective lens 36.

A reflected dispersive light beam from the magnetooptical disk 9 is applied to the objective lens 36, which converts the reflected dispersive light beam into a parallel light beam. The light beam from the objective lens 36 is applied to the mirror 35, and the light beam from the mirror 35 is applied to the beam splitter 34 and reflected by a reflecting surface thereof to a mirror (prism mirror) 38. The reflected light beam from the mirror 38 is applied to a Wollaston prism 39. The beam splitter 34 and the mirror (prism mirror) 38 are constructed as a unitary prism. The light beam from the Wollaston prism 39 is applied to a collimator lens 41 and converted thereby into a parallel light beam, which passes through a multi-element lens (condenser lens) 40 so as to be focused onto a detecting surface of a photodetector 42.

The photodetector 42 is divided into a central photodetector area, left and right photodetector areas, and upper and lower photodetector areas. Of the focused light beam from the multi-element lens 40, a light beam based on a disk servo signal recorded (formed) in advance on the recording surface of the magnetooptical disk 9 irradiates the central photodetector area, ± linear diffracted light beams generated by the diffraction grating 33 irradiate the left and right photodetector areas, respectively, and p- and s-polarized light beams separated as upper and lower light beams by the Wollaston prism 39 irradiate the upper and lower photodetector areas, respectively. The central photodetector area reproduces a disk servo signal. Since the central photodetector area is further divided into four segments, it generates a focus error signal. A focus error signal is obtained on the basis of the difference between detected output signals from the left and right photodetector areas.

Detected output signals from the upper and lower photodetector areas of the photodetector 42 are supplied respectively to a subtractor 43 and an adder 44, which subtract the supplied signals one from the other and add the supplied signals to each other, respectively. The subtractor 43 and the adder 44 apply a difference output signal (current signal) and a sum output signal (current signal), respectively, to output terminals 45, 46.

In the recording mode, the laser beam source 31 successively generates laser beams modulated by the PLL lock signal, the test signals 1, 2, and the data, respectively, for each of the sectors, and the magnet 30 applies a magnetic field of one polarity (e.g., N pole) or the other polarity (e.g., S pole) to one position on the magnetooptical disk 9, while at the same time the modulated focused laser beams from the objective lens 36 are applied to the same position on the magnetooptical disk 9.

In the reproducing mode, the laser beam source 31 generates a DC laser beam. Based on the generated DC laser beam, the objective lens 36 applies a focused DC laser beam to the magnetooptical disk 9. A reflected laser beam from the magnetooptical disk 9 is applied to the photodetector 42, whose detected output signals are applied to the subtractor 43 which produces a difference output signal. Based on the difference output signal, the PLL lock signal, the test signals 1, 2, and the data are successively reproduced from each of the sectors.

In the erasing mode, the laser beam source 31 generates a DC laser beam whose power is greater than the DC laser beam generated in the reproducing mode. Based on the generated DC laser beam, the objective lens 36 applies a focused DC laser beam to the magnetooptical disk 9, while at the same time the magnet 30 imposes a magnetic field whose polarity is opposite to that in the recording mode on the magnetooptical disk 9.

In each of the recording, reproducing, and erasing modes, an address signal (modulated signal), a laser power control signal, a tracking error signal, and a focus error signal are generated on the basis of the detected output signals from the photodetector 42 and also the sum output signal from the adder 44. Based on the tracking error signal and the focus error signal, the biaxial device 37 is controlled to effect focusing servo and tracking servo operation on the objective lens 36. Based on the laser power control signal, the power of the laser beam emitted from the laser beam source 31 is controlled.

Referring back to FIG. 8, a sum signal h which is generated in the recording and reproducing modes from the adder 44 (see FIG. 8) of the optical head 8 is supplied to a current-to-voltage converter amplifier 12, which converts the current signal into a voltage signal i and amplifies same with a desired amplification factor. The voltage signal i from the amplifier 12 is supplied to a binary signal generator 13, which converts the voltage signal i into a binary signal, i.e., waveform-shapes the voltage signal i into a rectangular signal. An output signal j from the binary signal generator 13 is supplied to an address demodulator 14 and a PLL 15. The PLL 15 is locked by the rectangular signal j of the address signal (modulated address signal) that is reproduced from the magnetooptical disk 9. A clock signal k from the PLL 15 is supplied to the address demodulator 14, which produces an address signal 1 by demodulating the modulated address signal. The address signal 1 is supplied to a system controller 16, which generates a timing signal m based on the address signal 1.

A recording system will now be described below. Data (8-bit digital data) a from an input terminal 1 is supplied to an interface 2, which supplies output data b to a buffer memory 3. Data read from the buffer memory 3 based on the clock signal k from the PLL 15 is supplied to a modulator 4, which modulates the data according to a mark edge modulation process with RLL (run-length limited) (1, 7), based on the timing signal m from the system controller 16 and the clock signal k from the PLL 15. The RLL (1, 7) means a code in which the number of logic values 0 between logic values 1, 1 is limited to 1 at minimum and 7 at maximum. The mark edge modulation process is a modulation process in which an output signal level transition is caused only when the logic value of an input data signal is 1.

The clock signal k from the PLL 15 and the timing signal m from the system controller 16 are supplied to a fixed-part generator 6, which generates a PLL lock signal and waveform equalization test signals (test signals 1, 2) e.

Modulated data d from the modulator 4 and the PLL lock signal and the waveform equalization test signals from the fixed-part generator 6 are supplied to a selector switch 5. The selector switch 5 is controlled by the timing signal m from the system controller 16, and supplies a selected output signal f to a driver 7. The driver 7 supplies a drive current g modulated by the PLL lock signal, the waveform equalization test signals 1, 2, and the modulated data to the laser beam source 31 (see FIG. 9) of the optical head 8. The laser beam emitted from the laser beam source 31 is modulated by the laser power control signal and the timing signal m to record the PLL lock signal, the waveform equalization test signals 1, 2, and the data successively following the previously recorded (formed) address signal, in each sector on the land between pregrooves of the magnetooptical disk 9.

In this embodiment, the waveform equalization test signals e generated by the fixed-part generator 6 are modulated in the same manner as the data modulated by the modulator 4. Therefore, the selector switch 5 switches between the similarly modulated signals generated by the fixed-part generator 6 and the modulator 4. However, the fixed-part generator 6 may generate a signal which has not been modulated, and the selector switch 5 may be connected to the input stage of the modulator 4 for switching between the output data from the buffer memory 3 and the output signals from the fixed-part generator 6.

A reproducing system will then be described below. A current signal n from the subtractor 43 (see FIG. 9) of the optical head 8 is supplied to a current-to-voltage converter amplifier 17, which converts the current signal into a voltage signal o and amplifies same with a suitable amplification factor. The voltage signal o from the amplifier 17 is supplied to an A/D converter 18 and a binary signal generator 23. The A/D converter 18 converts the voltage signal o into a digital signal, and the binary signal generator 23 converts the voltage signal o into a binary signal, i.e., waveform-shapes the voltage signal o into a rectangular signal t. The rectangular signal t from the binary signal generator 23 is supplied to a PLL 24, which generates a data reproduction clock signal u locked in phase with the rectangular signal t.

The voltage signal o supplied from the amplifier 17 to the A/D converter 18 is converted into digital data p in synchronism with the data reproduction clock signal u based on the clock signal u from the PLL 24. The digital data p from the A/D converter 18 is supplied to an adaptive waveform equalizer 19 comprising a transversal filter, and equalized in waveform by the adaptive waveform equalizer 19. The waveform equalization process will be described later on. Data q which is equalized in waveform by the adaptive waveform equalizer 19 is supplied to and decoded by a Viterbi decoder 20 for improving, i.e., lowering, an error rate. A decoded output signal from the Viterbi decoder 20 is supplied to an interface 21, which supplies reproduced data s to an output terminal 22.

Figure 4:
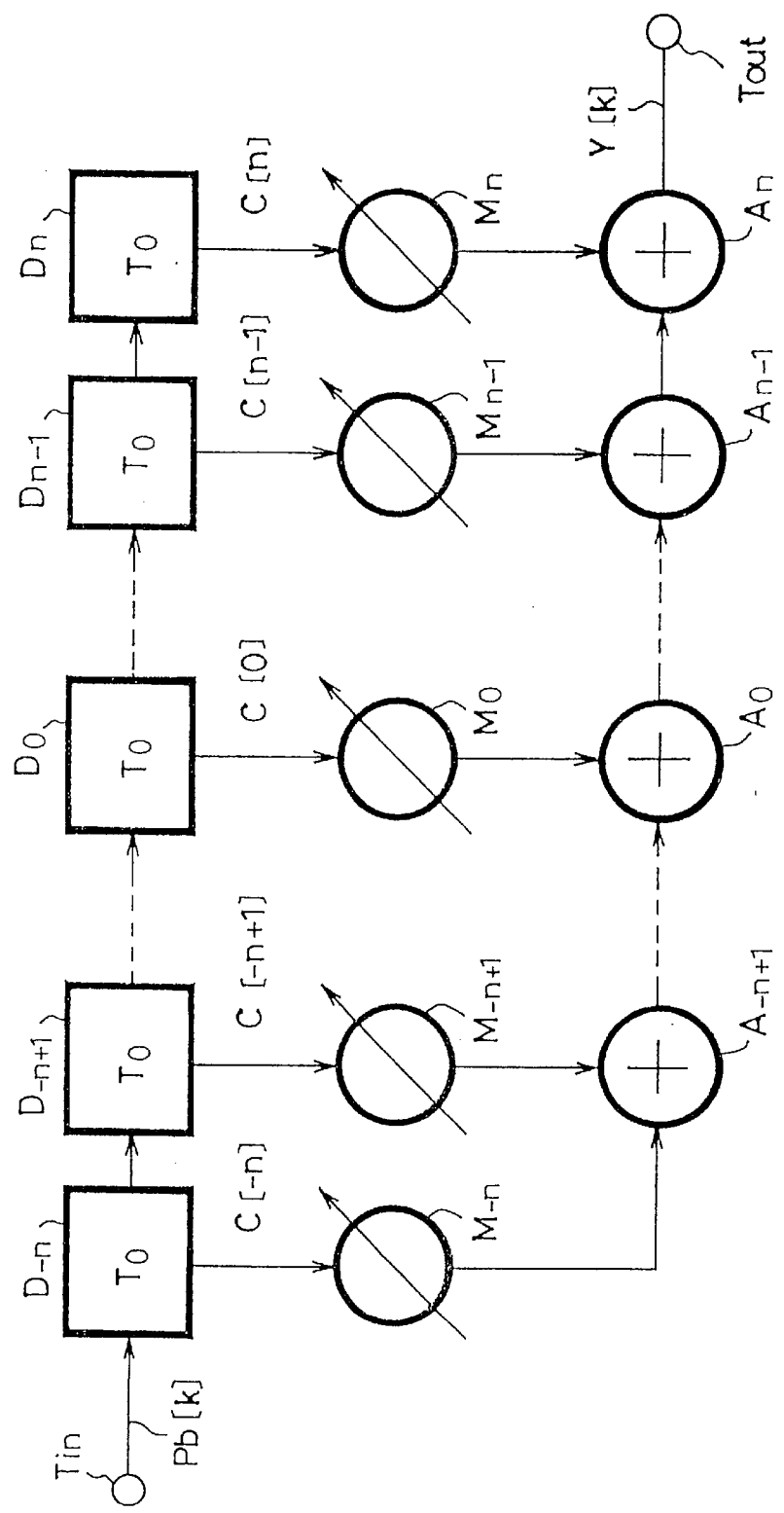
FIG. 4 is a block diagram of a waveform equalizer used in the embodiment of the present invention.

The principles of the waveform equalization process carried out by the adaptive waveform equalizer 19 will be described below. The adaptive waveform equalizer 19 comprises a transversal filter as shown in FIG. 4. Delay units D-n, D-n+1, ..., D0, ..., Dn+1, Dn have equal delay times T0 and are successively connected in cascade in the order named. Input data Pb[k] (k represents time) from an input terminal Tin is supplied to the first delay unit D-n. Output data from the respective delay units D-n, D-n+1, ..., D0, ..., Dn+1, Dn are supplied to the next delay units D-n+1, ..., D0, ..., Dn+1, Dn and an output terminal Tout, and also supplied to respective coefficient multipliers M-n, M-n+1, ..., M0, ..., Mn+1, Mn, which multiply the supplied data by respective tap coefficients C[-n], C[-n+1], ..., C[0], ..., C[n-1], C[n]. Data from the respective coefficient multipliers M-n, M-n+1, ..., M0, ..., Mn+1, Mn are supplied respectively to adders A-n, A-n+1, ..., A0, ..., An+1, An, which accumulate the data into accumulated output data Y[k] supplied to the output terminal Tout. By varying the tap coefficients, it is possible to vary the equalization characteristics of the adaptive waveform equalizer 19.

If input and output data are represented respectively by Pb[k], Y[k] and a tap coefficient by C[n], then the output data Y[k] is expressed by the following equation:

$$Y[n] = \sum_{i=-N}^{N} C[i] \cdot Pb[k-i] \qquad (1)$$

where the number of taps of the adaptive waveform equalizer 19 is represented by 2N+1.

Figure 5:
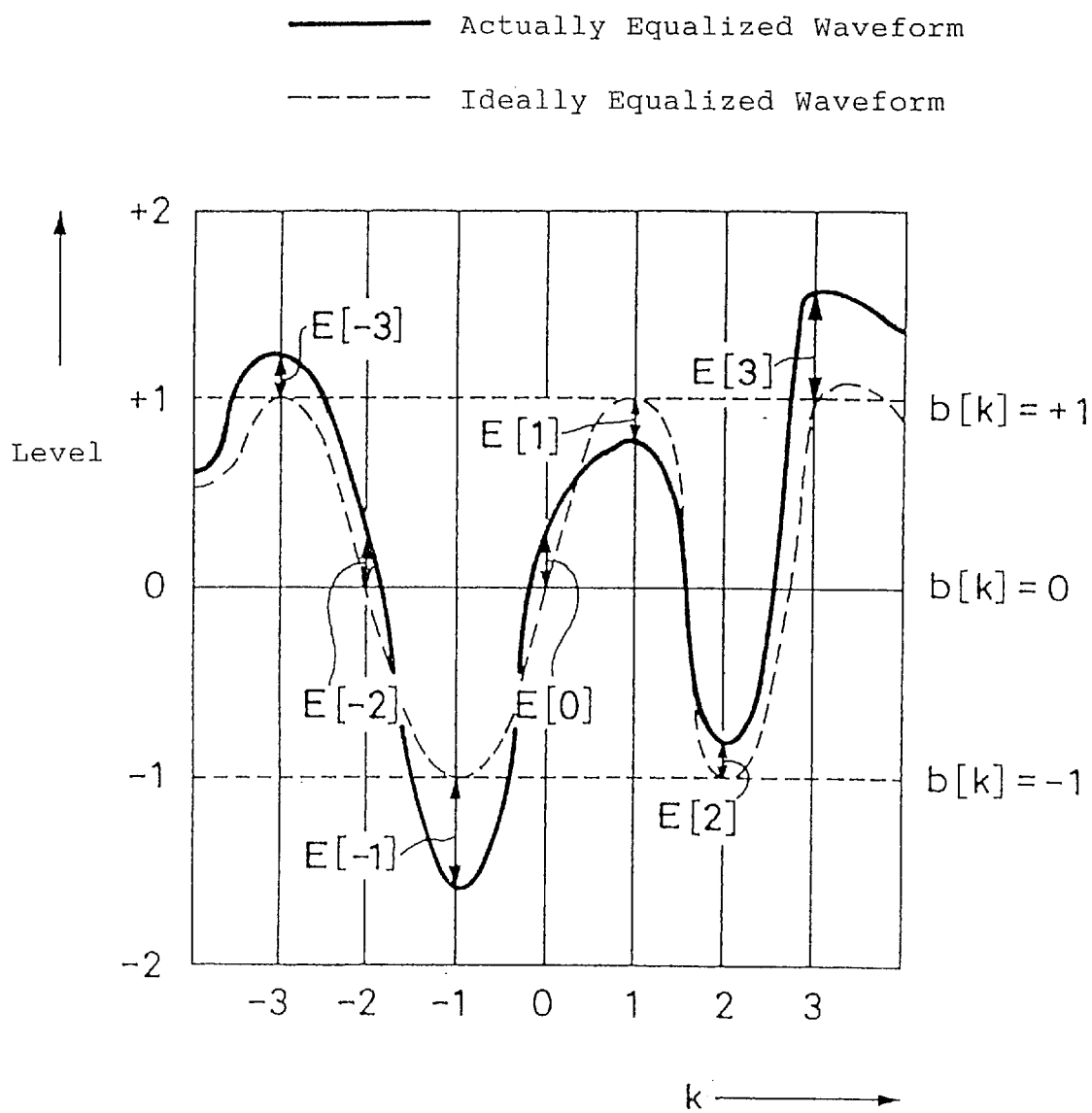
FIG. 5 is a diagram showing an equalization error between an actual equalized signal and an ideal equalized signal.

FIG. 5 shows the waveform (solid-line curve) of an equalized signal Y[k] actually equalized at a time k and the waveform (broken-line curve) of an ideally equalized signal b[k] at the time k. In FIG. 5, the horizontal axis represents the time k and the vertical axis a level (relative level) (+2~0~-2). An equalization error E[k] at the time k is expressed by the following equation:

$$E[k] = b[k] - Y[k] \qquad (2)$$

In FIG. 5, equalization errors E[-3], E[-2], E[-1], E[0], E[1], E[2], E[3] at the instant when the ideally equalized signal b[k] takes a maximum value of 1, an inflection value of 0, and a minimum value of -1, i.e., at times k=-3, -2, -1, 0, 1, 2, 3, respectively, are determined from the graph.

In order to optimally determining the waveform equalization characteristics of the transversal filter, the tap coefficient C[n] is determined to equalize the actually equalized signal Y[k] to the ideally equalized signal b[k] as much as possible. To this end, each tap coefficient C[n] is determined according to the method of least squares in order to minimize the following equation:

$$\sum_{k=1}^{K} E[k]^2 \qquad (3)$$

An example in which the ith tap coefficient C[i] is updated will be described below. In order to minimize the equation (3), the equation (3) is partially differentiated by C[i] as follows:

$$\frac{\partial \sum_{k=1}^{K} E[k]^2}{\partial C[i]} = 2 \sum_{k=1}^{K} E[k] \cdot \left[ \frac{\partial E[k]}{\partial C[i]} \right] \qquad (4)$$

$$= -2 \sum_{k=1}^{K} E[k] \cdot Pb[k-1]$$

By writing the left side of the equation (4) as H[i] and substituting the equation (2) in the equation (4), the following equation is obtained:

$$H[i] = \sum_{k=1}^{K} -2Pb[k-1] \cdot (b[k] - Y[k]) \qquad (5)$$

In order to reduce H[i] to zero ideally, the coefficient C[i] is reduced a little if H[i] is positive, and increased a little if H[i] is negative. If one corrected quantity of the coefficient C[i] is indicated by a, then the following equation is satisfied:

$$C[i] \leftarrow C[i] - \alpha \cdot \frac{H[i]}{|H[i]|} \quad (6)$$

By repeating the above correction of the coefficient C[i], the actually equalized signal Y[k] converges toward the ideally equalized signal b[k].

A setting process of establishing the waveform equalization characteristics of the adaptive waveform equalizer 19 will be described below with reference to FIGS. 1, 2, and 3.

According to a basic operation for establishing the waveform equalization characteristics of the adaptive waveform equalizer 19, while the reproduced test signals 1, 2 are being transferred 1 bit at a time, the values of the tap coefficients C[i] (i=−n, −n+1, . . . , 0, . . . , n−1, n) are simultaneously varied parallel to each other in order that the determined of the equation (5) becomes:

H[i]=0 and the values of the tap coefficients C[i] (i=−n, −n+1, . . . , 0, . . . , n−1, n) obtained with minimum bit signals (last bit signals) of the reproduced test signals 1, 2 are used as coefficients for establishing the waveform equalization characteristics.

Figure 1:
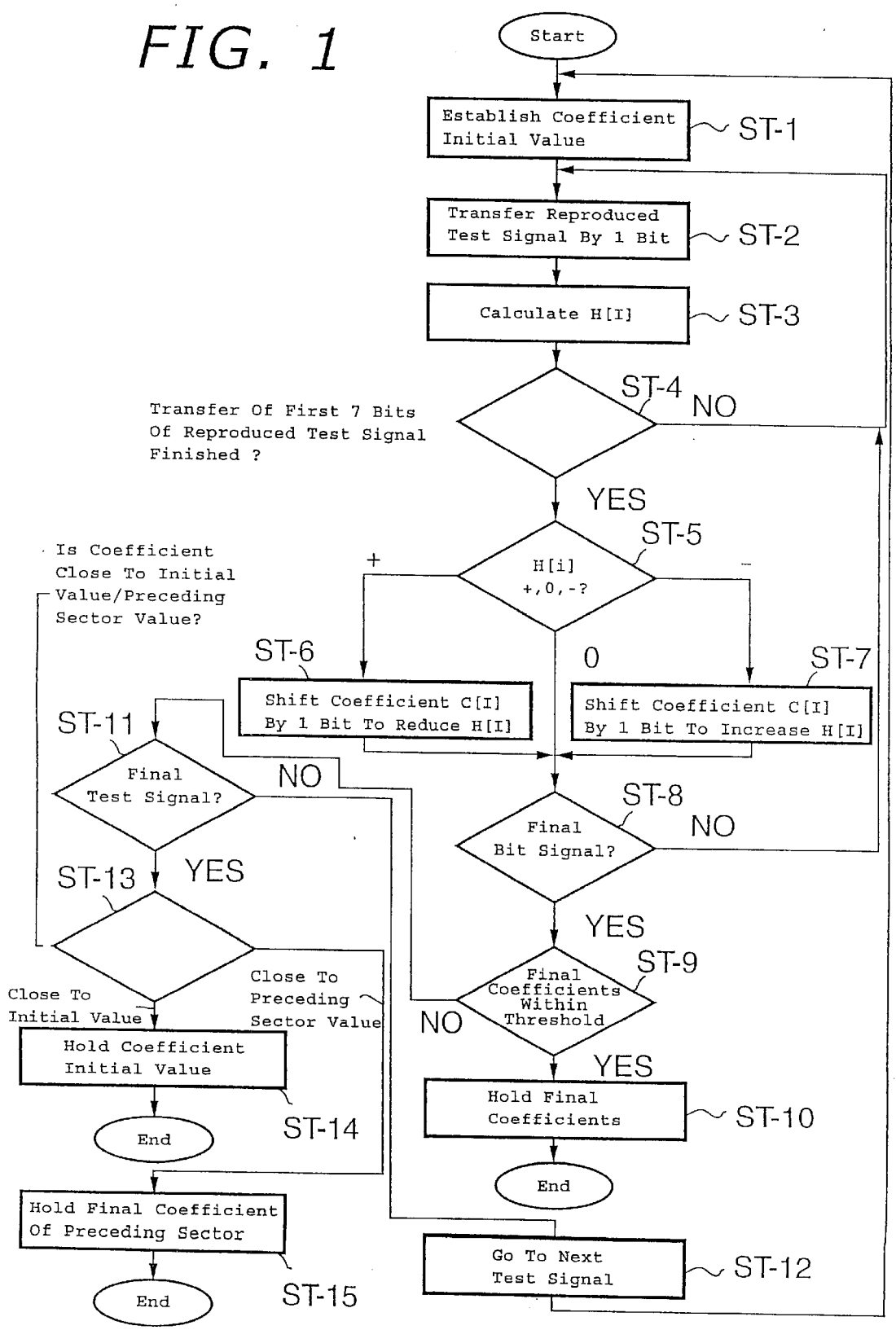
FIG. 1 is a flowchart illustrative of operation of an embodiment of the present invention.

FIG. 1 is a flowchart of the process of establishing the waveform equalization characteristics of the adaptive waveform equalizer 19.

Figure 2:
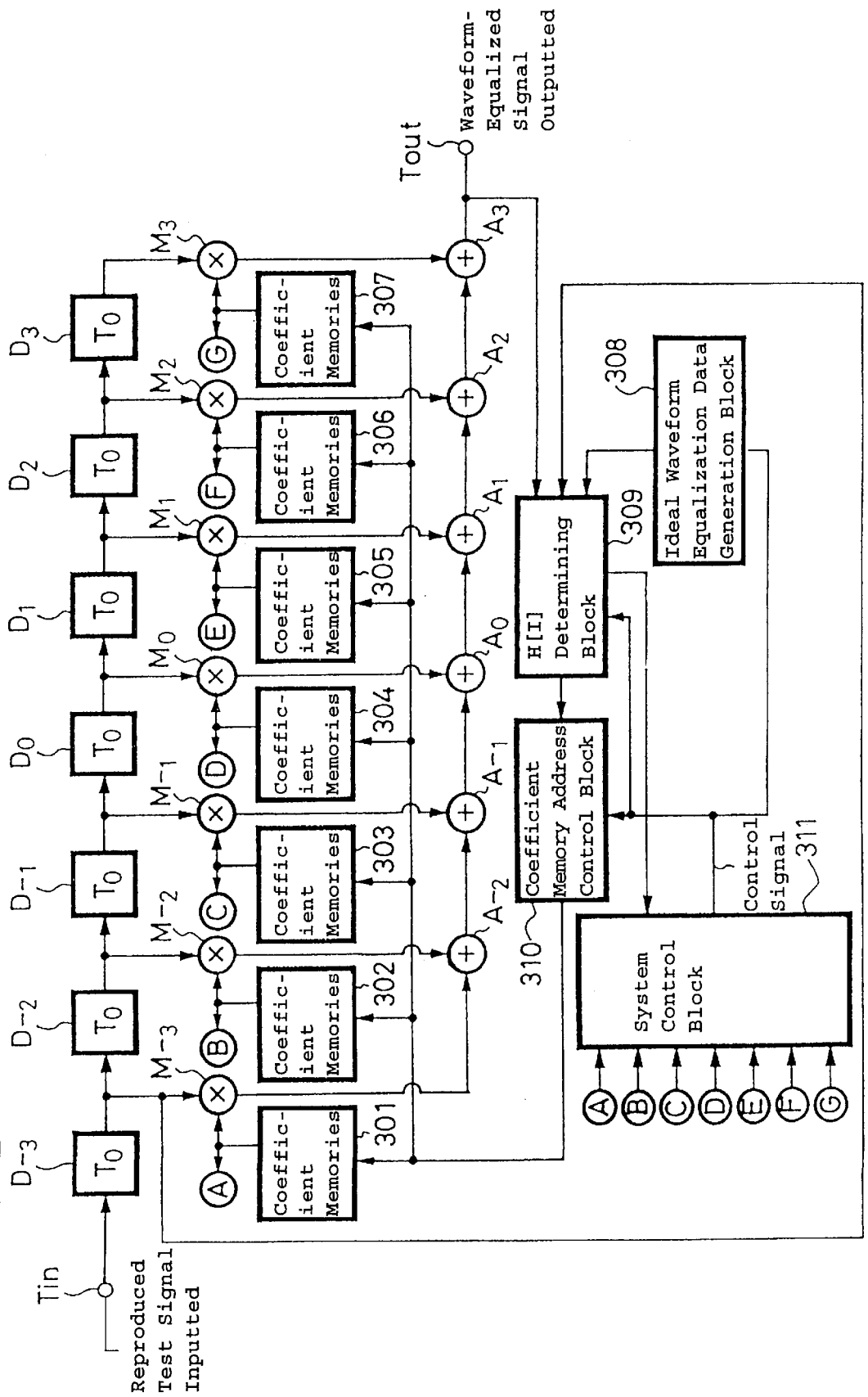
FIG. 2 is a block diagram of major functional blocks of the embodiment of the present invention.
Figure 3:
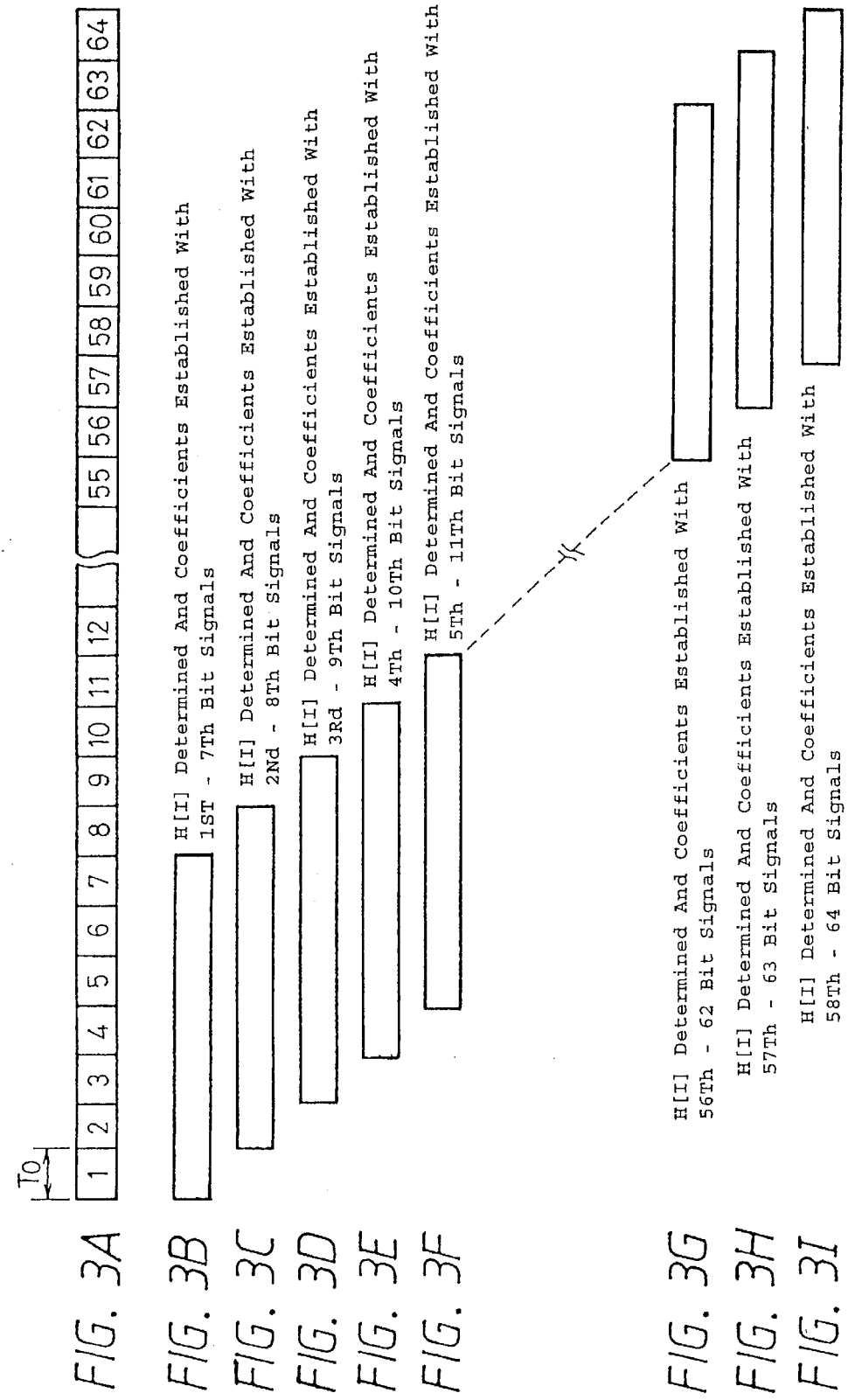
FIGS. 3A through 3I are a timing chart showing the timing relationship between transferred data and H(i) determination and coefficient setting in the embodiment of the present invention.

FIG. 2 shows major functional blocks used for establishing the waveform equalization characteristics of the adaptive waveform equalizer 19. In FIG. 2, delay units D-3, D-2, D-1, D0, D1, D2, D3 having a delay times T0, coefficient memories 301, 302, 303, 304, 305, 306, 307 for supplying tap coefficients C-3, C-2, C-1, C0, C1, C2, C3 to respective coefficient multipliers, and adders A-2, A-1, A0, A1, A2, A3 jointly make up a waveform equalization 7th-order transversal filter where n=3. An ideal waveform equalization data generating block 308 stores ideal waveform equalization data produced when the test signals 1, 2 are reproduced and equalized, and outputs the ideal waveform equalization data in each 1-bit period in response to a control signal. An H[i] determining block 309 calculates the determined value H[i] of the equation (5) based on an input reproduced test signal Pb(i), a transversal filter output signal Y(k), and ideally equalized waveform data b(k), determines whether the value H[i] is zero, positive, or negative for each of the tap coefficients C[i], and outputs the determined result. Depending on the determined result from the H[i] determining block 309, a coefficient memory address control block 310 controls the addresses of the coefficient memories so that given coefficient values are supplied from the coefficient memories to the multipliers. A system control block 311 effects overall control on the establishment of the waveform equalization characteristics of the transversal filter, and determines whether the established values of the tap coefficients C[i] are allowable with respect to optimum tap coefficients expected in each of the sectors. The means for generating control signals, the coefficient memories 301–307, the ideal waveform equalization data generating block 308, the H[i] determining block 309, the coefficient memory address control block 310, and the system control block 311 are implemented by computer means such as a microcomputer or the like and peripheral circuit means therefor.

An input terminal Tin of the adaptive waveform equalizer 19 thus constructed is supplied successively with reproduced test signals 1, 2 having a 64-bit length corresponding to 8 bytes) and a reproduced data signal which have been converted into a parallel 8-bit digital signal by the A/D converter 18 and modulated according to the mark edge modulation process with RLL (1, 7).

FIGS. 3A through 3I show the timing relationship between transferred data (reproduced test signals) transferred by the delay units D-3, D-2, D-1, D0, D1, D2, D3 and the determination of H[i] and the establishment of the coefficients.

The setting process of establishing the waveform equalization characteristics of the adaptive waveform equalizer 19 will be described in detail below with reference to FIG. 1.

When the reproduced test signal 1 starts being supplied to the input terminal Tin, initial values of the tap coefficients C-3, C-2, C-1, C0, C1, C2, C3 are established in a step ST-1. The initial values of the tap coefficients are determined in advance as the same for each of the sectors or depending on the diameter of a recording track where the reproduced test signals 1, 2 are recorded on the magnetooptical disk 9. For either one of the initial values, an average value of optimum tap coefficients that can be expected is selected. In the embodiment, the initial values of the tap coefficients [C-3, C-2, C-1, C0, C1, C2, C3] are set to [0, 0, 0, 1, 0, 0, 0].

In a step ST-2, the reproduced test signal is transferred 1 bit over the delay units D-3~D3, and the ideal waveform equalization data generating block 308 generates ideal waveform equalization data. Since the pattern of the reproduced test signal is already known, a value depending on the pattern of the reproduced test signal is stored as the value of the ideal waveform equalization data in the ideal waveform equalization data generating block 308 which comprises memory means.

In a step ST-3, the terms of the right side of the equation (5) for determining a value H[i] depending on a reproduced test signal Pb[k−1] from the input terminal Tin, a waveform-equalized output signal Y[k], and ideally waveform-equalized data b[k] are calculated.

In a step ST-4, it is determined whether the transfer of first 7 bits of the reproduction signal has been finished as a result of the transfer process in the step ST-2. If the transfer of first 7 bits has not been finished, then the steps ST-2~ST-4 are cyclically executed. The cyclic execution is repeated until the transfer of first 7 bits of the reproduction signal is determined as being finished in the step ST-4. When the transfer of first 7 bits of the reproduction signal is finished, the delay unit D3 stores the first bit signal, the delay unit D2 stores the second bit signal, the delay unit D1 stores the third bit signal, the delay unit D0 stores the fourth bit signal, the delay unit D-1 stores the fifth bit signal, the delay unit D-2 stores the sixth bit signal, and the delay unit D-3 stores the seventh bit signal.

If the transfer of first 7 bits of the reproduction signal is determined as being finished in the step ST-4, then the H[i] determining block 309 determines whether each of the determined values H[i] (i=−3, −2, −1, 0, 1, 2, 3) for the respective tap coefficients C-3, C-2, C-1, C0, C1, C2, C3 is positive, zero, or negative.

If the determined value H[i] is positive, then the coefficient memory address control block 310 controls the coefficient memories 301–307 to generate values of the tap coefficients such that the determined value H[i] will be smaller than the present value in a step ST-6.

If the determined value H[i] is negative, then the coefficient memory address control block 310 controls the coefficient memories 301–307 to generate values of the tap coefficients such that the determined value H[i] will be greater than the present value in a step ST-7.

If the determined value H[i] is zero, then the tap coefficients are not varied, but control proceeds to a step ST-8.

The value H[i] is determined and the tap coefficients are established for each of the tap coefficients. Therefore, the steps ST-5, ST-6, ST-7 are executed in seven loops for the respective tap coefficients, though only one loop is illustrated in the flowchart shown in FIG. 1 for the sake of brevity.

In the step ST-8, it is determined whether the 64th bit signal, i.e., the final bit signal, of the reproduced test signal having the 64-bit length has been transferred or not as a result of the transfer in the step ST-2.

If the final bit signal has not been transferred in the step ST-8, then the steps ST-2~ST-8 are cyclically executed until the final bit signal has been transferred.

FIGS. 3A through 3I show the timing relationship with respect to the transferred data (the reproduced test signal) processed so far. FIG. 3A shows the reproduced test signal 1 (or 2) having the 64-bit length transferred successively over the delay units D-3~D3, and FIGS. 3B~3I show the timing of the calculation and determination of the value H[i] and the control of the establishment of tap coefficients, carried out for every 7 bits of the reproduced test signal.

When the reproduced test signal 1 starts being inputted successively from its 1st bit signal, the terms of the right hand of the equation (5) are calculated until 7 bits from the 1st through 7th bit signals are supplied to the delay units D-3~D3 in the period shown in FIG. 3B. When the 7 bits are supplied to the delay units D-3~D3, the value H[i] is determined, and the establishment of tap coefficients is controlled depending on the determined value H[i]. When the next 8th bit signal is transferred, the value H[i] is calculated determined, and the establishment of tap coefficients is controlled with 7 bits from the 2nd through 8th bit signals in the period shown in FIG. 3C.

Subsequently, the value H[i] is calculated determined, and the establishment of tap coefficients is controlled each time the reproduced test signal is transferred 1 bit in each of the period shown in FIG. 3D of 7 bits from the 3rd through 9th bit signals up to the period shown in FIG. 3I of 7 bits from the 58th through 64 bit signals.

Table 1 below shows an example of established tap coefficients up to the time when the 11th bit signal of the reproduced test signal is inputted.

In this example, the logic level of the signal supplied to the adaptive waveform equalizer 19 is in the range of −2~−1~0~+1~+2, and the range in which the logic level is variable is quantized to 8 bits (256 steps).

Table 1: Example of established tap coefficients

|  |  | Tap coefficients | | | | | | |
| --- | --- | --- | --- | --- | --- | --- | --- | --- |
|  |  | $C_{-3}$ | $C_{-2}$ | $C_{-1}$ | $C_0$ | $C_1$ | $C_2$ | $C_3$ |
| Reproduction test signal | 1st–7th bits | (+) 0 | (−) 0 | (+) 0 | (+) 1 | (+) 0 | (−) 0 | (+) 0 |
|  | 2nd–8th bits | (−) −1/64 | (+) 1/64 | (+) −1/64 | (+) 63/64 | (+) −1/64 | (+) 1/64 | (+) −1/64 |
|  | 3rd–9th bits | (−) 0 | (−) 0 | (0) −2/64 | (0) 62/64 | (0) −2/64 | (+) 0 | (+) 0 |
|  | 4th–10th bits | (−) −1/64 | (+) 1/64 | (+) −1/64 | (+) 63/64 | (+) −1/64 | (+) 1/64 | (+) −1/64 |
| | 5th–11th bits | 0 | 0 | −3/64 | 61/64 | −3/64 | −2/64 | 0 |
| | . | . | . | . | . | . | . | . |
| | . | . | . | . | . | . | . | . |
| | . | . | . | . | . | . | . | . |

In Table 1, the numeral values in the columns of the tap coefficients represent the values of the tap coefficients, and the symbols (+), (0), (−) in the columns of the tap coefficients represent the result of the determined value H[i] obtained when the waveform is equalized by the associated values of the tap coefficients. The symbol (+) means that the result is positive, the symbol (0) means that the result is zero, and symbol (−) means that the result is negative.

The process of establishing the tap coefficient C0 in Table 1 will be described below.

First, an initial value [1] is established for the tap coefficient C0, and the waveform of the 1st through 7th bits of the reproduced test signal is equalized with the initial value. The determined result H[i] (i=0) of the waveform equalization is positive. Since the determined result is positive, the value of the tap coefficient C0 is newly set to "63/64" to reduce the determined result H[i] (i=0) so as to be smaller than the present value. Then, the waveform of the 2nd through 8th bits of the reproduced test signal is equalized with the new value "63/64" of the tap coefficient C0. The determined result H[i] (i=0) of the waveform equalization is positive. Since the determined result is positive, the value of the tap coefficient C0 is newly set to "62/64", to reduce the determined result H[i] (i=0) so as to be smaller than the present value. Then, the waveform of the 3rd through 9th bits of the reproduced test signal is equalized with the new value "62/64" of the tap coefficient C0. The determined result H[i] (i=0) of the waveform equalization is zero. Inasmuch as the determined result H[i] (i=0) of the waveform equalization is zero, the value of the tap coefficient C0 is not varied, and remains to be "62/64". The waveform of the 4th through 10th bits of the reproduced test signal is equalized with the value "62/64" of the tap coefficient C0. The determined result H[i] (i=0) of the waveform equalization is positive. Since the determined result is positive, the value of the tap coefficient C0 is newly set to "61/64" to reduce the determined result H[i] (i=0) so as to be smaller than the present value. The establishment of the tap coefficient C0 is thus controlled until finally it converges to an optimum tap coefficient.

If the final bit signal has been transferred in the step ST-8, then the system control block 311 determines whether each of the tap coefficients established depending on the 7 bits ranging from the 58th to 64th bits, i.e., the final tap coefficient with respect to the reproduced test signal, falls within a predetermined threshold or not. Normally, if the waveform equalization is carried out normally, the final value of each of the tap coefficients converges. The threshold in the step ST-9 is determined for each of the tap coefficients.

If each of the final tap coefficients falls in the threshold in the step ST-9, then the final tap coefficients are held as optimum tap coefficients in a step ST-10, after which the setting process of establishing the waveform equalization characteristics of the transversal filter is finished.

The adaptive waveform equalizer 19 for which the waveform equalization characteristics have thus been established effects waveform equalization on a successively supplied data signal with the newly established waveform equalization characteristics.

If each of the final tap coefficients does not fall in the threshold in the step ST-9, then it is determined in a step ST-11 whether the reproduced test signal transferred up to the 64th bit signal is a final one of a plurality of test signal or not. Since the test signals 1, 2 are reproduced in this embodiment, it is determined whether the reproduced test signal is the reproduced test signal 2 or not. Whether the reproduced test signal is the reproduced test signal 1 or the reproduced test signal 2 is determined by identifying the test number data added in front of the test signals.

If the reproduced test signal is not the final test signal in the step ST-11, then the ideal waveform equalization data generating block 308, the H[i] determining block 309, and the coefficient memory address control block 310 are reset to go to the establishment of waveform equalization characteristics using the next test signal (test signal 2) having the 64-bit length in a step ST-12. Thereafter, the steps ST-1 through ST-8 are cyclically executed.

If the reproduced test signal is the final test signal in the step ST-11, then it means that the final tap coefficient does not converge within the threshold even with the test signal 2. In this embodiment, the following processing is carried out in order to be able to establish waveform equalization characteristics in a better direction if the final tap coefficient does not converge within the threshold.

In a step ST-13, the system control block 311 determines whether the final tap coefficient determined by the final test signal is of a value close to the initial value established in the step ST-1 or a value close to the optimum tap coefficient determined in the preceding sector.

If the final tap coefficient is determined to be of a value close to the initial value in the step ST-13, then the initial value is held as the optimum tap coefficient in a step ST-14, and then the setting process of establishing the waveform equalization characteristics of the transversal filter is finished.

If the final tap coefficient is determined to be of a value close to the optimum tap coefficient determined in the preceding sector in the step ST-13, then the optimum tap coefficient determined in the preceding sector is held as the optimum tap coefficient in the present sector in a step ST-15, and then the setting process of establishing the waveform equalization characteristics of the transversal filter is finished.

The adaptive waveform equalizer 19 for which the waveform equalization characteristics have thus been established by the final reproduced test signal effects waveform equalization on a successively supplied data signal with the newly established waveform equalization characteristics.

Figure 7:
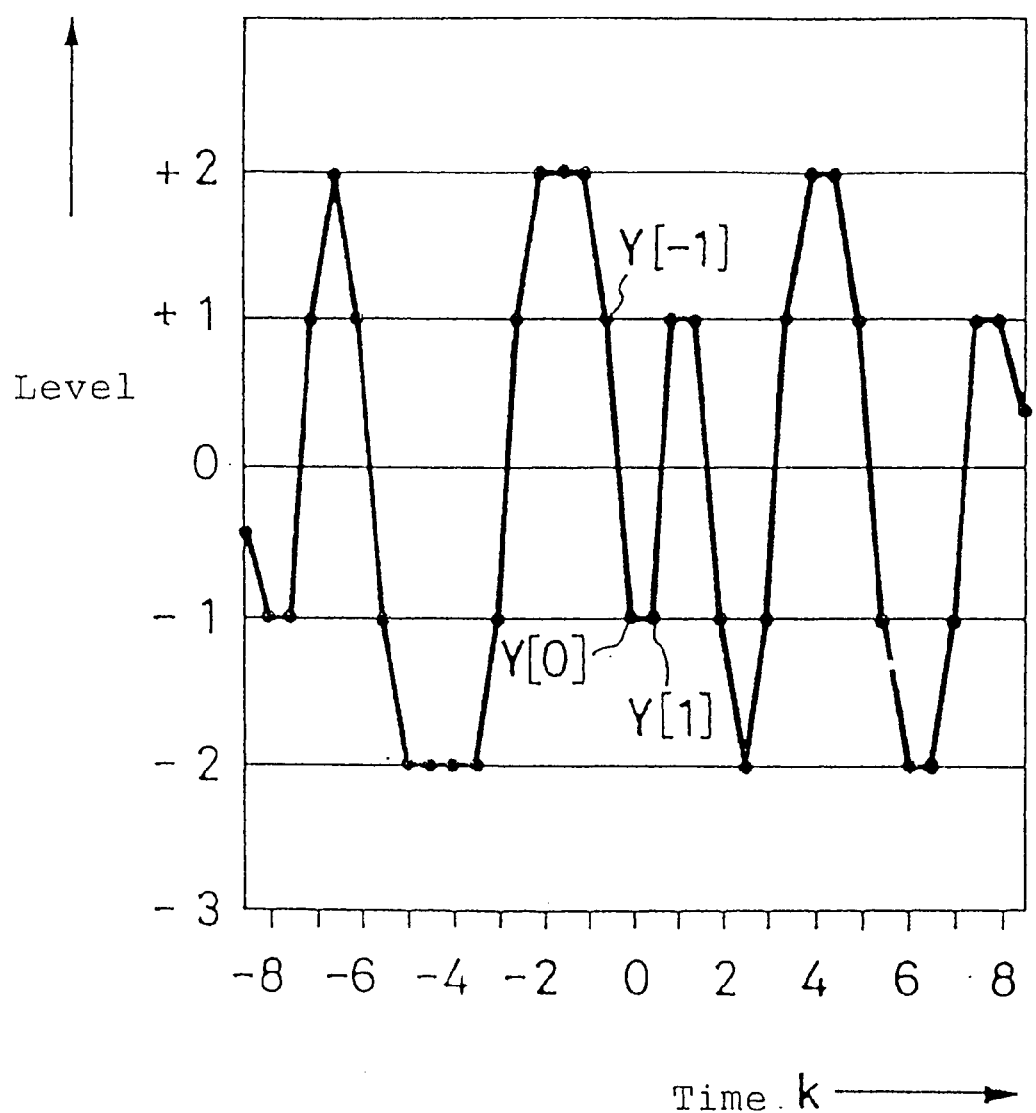
FIG. 7 is a diagram showing the waveform of a waveform-equalized signal outputted from the waveform equalizer.

FIGS. 6 and 7 show examples of input and output signal waveforms at times k in the range of −9~0~+9 of the adaptive waveform equalizer 19 for which the waveform equalization characteristics have thus been established. As is apparent from a comparison between FIGS. 6 and 7, variations in the logic level contained in the input signal are completely eliminated, indicating that the adaptive waveform equalizer 19 is optimally set to the waveform equalization characteristics.

When a signal equalized in waveform by the adaptive waveform equalizer 19 optimally set to the waveform equalization characteristics is decoded by the Viterbi decoder 20 in the next stage, the reproduced data signal suffers reduced errors, and is representative of the original data highly accurately.

According to the present invention, as described above, encoded data and test signals for determining optimum tap coefficients for an adaptive waveform equalizer are recorded on a recording medium in each unit recording area thereof. For reproducing the data from the recording medium, the tap coefficients of the adaptive waveform equalizer are controlled for equalizing waveform-equalized signals of the reproduced test signals to ideally equalized conditions as much as possible until final optimum tap coefficients suitable to the unit recording areas will be established. Therefore, when the data are reproduced from the recording medium, the data can be equalized in waveform stably, reliably, and quickly by a small-scale circuit. Accordingly, there are provided an apparatus for recording data, an apparatus for reproducing data, an a method of reproducing data so as to be able to achieve high-density recording.

What is claimed is:

1. An apparatus for recording data by recording a management data signal for recording of a data signal in a first area in a unit recording area of a recording medium, and recording said data signal, which has been modulated to make a signal to be recorded on the recording medium suitable for recording on and reproducing from said recording medium, in a second area in the unit recording area of the recording medium, comprising:

recording signal forming means for forming and outputting, depending on a control signal, a test signal comprising a digital signal of as few bits as possible at an allowable error rate for establishing predetermined waveform equalization characteristics of adaptive waveform equalizing means which effects waveform equalization on a reproduced signal of said data recorded on said recording medium, and the data signal which has been modulated, following said test signal;

recording means for recording an output signal from said recording signal forming means on said recording medium; and control means for generating said control signal to record said test signal in said first area of said recording medium and said data signal in said second area of said recording medium, wherein said recording signal forming means forms first and second test signals in which only one of said first and second test signals is used in forming the waveform equalization characteristics during reproduction.

2. An apparatus according to claim 1, wherein said recording signal forming means comprises:

first test signal generating means for generating a respective test signal equivalent to being modulated;

first modulating means for modulating input data signal and outputting said data signal; and first switch means for selecting either one of an output signal from said first test signal generating means and an output signal from said first modulating means depending on said control signal, and supplying the selected output signal to said recording means.

3. An apparatus according to claim 1, wherein said recording signal forming means comprises:

second test signal generating means for generating a respective test signal prior to being modulated;

second switch means for selecting and outputting an output signal from said second test signal generating means or said input data signal depending on said control signal; and second modulating means for modulating an output signal from said second switch means.

4. An apparatus according to claim 1, wherein said recording signal forming means forms said test signal which comprises at least 50 bits.

5. An apparatus for reproducing data by reproducing, from a recording medium in which a management data signal for recording of an encoded data signal and a test signal for establishing predetermined waveform equalization characteristics of adaptive waveform equalizing means which effects waveform equalization on a reproduced signal of said encoded data signal are recorded in a first area in a unit recording area, and the encoded data signal is recorded in a second first area in said unit recording area, said test signal and said encoded data signal, and decoding said encoded data signal, comprising:

signal reproducing means for reproducing said management data signal, said test signal, and said encoded data signal from said recording medium;

clock signal forming means for forming a clock signal in synchronism with a binary signal converted from an output signal from said signal reproducing means;

A/D converting means for converting the output signal from said signal reproducing means from an analog form into a digital form in response to said clock signal;

waveform equalizing means comprising an nth-order transversal filter with tap coefficients established by a coefficient control signal, for effecting waveform equalization on said test signal and said encoded data signal, which are outputted from said signal reproducing means, with waveform equalization characteristics depending on said tap coefficients, in response to said clock signal;

ideal waveform-equalized data generating means for generating ideal waveform-equalized data of said test signal in synchronism with an output signal from said A/D converting means;

equalization characteristics control means for generating said coefficient control signal in each unit recording area of said recording medium in a period in which said test signal is being inputted to said waveform equalizing means, in response to a control signal, and establishing waveform equalization characteristics of said waveform equalizing means so that an output signal from said waveform equalizing means will be equalized to said ideal waveform-equalized data;

decoding means for decoding the encoded data signal outputted from said waveform equalizing means into original data; and system control means for forming said control signal, determining whether said tap coefficients which are finally obtained have respective predetermined values or not, and finishing establishment of the waveform equalization characteristics for said waveform equalizing means if said tap coefficients have said predetermined values, wherein at least two test signals are recorded on said recording medium, and said system control means controls said equalization characteristics control means with a second one of the test signals if said waveform equalization characteristics cannot be established with a first one of the test signals, and wherein said system control means includes means for determining which of initial values and tap coefficient values associated with a unit recording area adjacent to a present unit recording area the tap coefficients determined by use of the second test signal are close to and, in response thereto, for controlling said equalization characteristics control means to set the tap coefficients of said waveform equalizing means to the appropriate one of the initial values and the tap coefficient values associated with a unit recording area adjacent to a present unit recording area, and finish establishment of the equalization characteristics of said waveform equalizing means if said tap coefficients which are finally obtained do not have the respective predetermined values.

6. An apparatus according to claim 5, wherein said transversal filter has memory means for generating said tap coefficients, and said equalization characteristics control means comprises:

determining means for determining, each time a 1 bit of said test signal is transferred, whether said tap coefficients which have been established before a 1 bit is transferred have respective appropriate values or not based on an output signal from said waveform equalizing means, an output signal from said ideal waveform-equalized data generating means, and tap output signals from said transversal filter; and coefficient control means for outputting address signals of said memory means as said coefficient control signal depending an output signal from said determining means to enable said memory means to generate new tap coefficients.

7. An apparatus according to claim 6, wherein said determining means determines whether said tap coefficients have said respective appropriate values or not depending on H[i] expressed by the following equation:

$$H[i] = \sum_{k=1}^{K} -2Pb[k-1] \cdot (b[k] - Y[k])$$

where k is the time sequence number of the signal converted by said A/D converting means, i is the tap sequence number of said transversal filter, Pb[k] is an input value of said transversal filter, b[k] is a value of said ideal waveform-equalized data, and Y[k] is an output value of said transversal filter.

8. A method of reproducing data by reproducing, from a recording medium in which a management data signal for recording of an encoded data signal and a test signal for establishing predetermined waveform equalization characteristics of adaptive waveform equalizing means which effects waveform equalization on a reproduced signal of said encoded data signal are recorded in a first area in a unit recording area, and the encoded data signal is recorded in a second first area in said unit recording area, said test signal and said encoded data signal, and decoding said encoded data signal, comprising the steps of:

reproducing said management data signal, said test signal, and said encoded data signal from said recording medium;

forming a clock signal in synchronism with a binary signal converted from an output signal from said signal reproducing means;

converting the output signal from said signal reproducing means from an analog form into a digital form in response to said clock signal;

effecting, using an nth-order transversal filter with tap coefficients established by a coefficient control signal, waveform equalization on said test signal and said encoded data signal, which are outputted from said signal reproducing means, with waveform equalization characteristics depending on said tap coefficients, in response to said clock signal;

generating ideal waveform-equalized data of said test signal in synchronism with a signal produced when the output signal from said signal reproducing means is converted from an analog form into a digital form;

generating said coefficient control signal in each unit recording area of said recording medium in a period in which said test signal is being sent to the step of effecting waveform equalization, in response to a control signal, and establishing waveform equalization characteristics for said step of effecting waveform equalization so that an output signal from said step of effecting waveform equalization will be equalized to said ideal waveform-equalized data;

decoding the encoded data signal outputted from said step of effecting waveform equalization into original data; and forming said control signal, determining whether said tap coefficients which are finally obtained have respective predetermined values or not, and finishing establishment of the waveform equalization characteristics for said step of effecting waveform equalization if said tap coefficients have said predetermined values, wherein at least two test signals are recorded on said recording medium, and said step of forming said control signal controls said step of establishing waveform equalization characteristics with a second one of the test signals if said waveform equalization characteristics cannot be established with a first one of the test signals, and wherein said step of forming said control signal includes determining which of initial values and tap coefficient values associated with a unit recording area adjacent to a present unit recording area the tap coefficients determined by use of the second test signal are close to and, in response thereto, controls said step of generating coefficient control signal to set the tap coefficients of said transversal filter to the appropriate one of the initial values and the tap coefficient values associated with a unit recording area adjacent to a present unit recording area, and finishes establishment of the equalization characteristics for said step of effecting waveform equalization if said tap coefficients which are finally obtained do not have the respective predetermined values.

9. A method according to claim 8, wherein said transversal filter has memory means for generating said tap coefficients, and said step of establishing waveform equalization characteristics comprises the steps of:

determining, each time a 1 bit of said test signal is transferred, whether said tap coefficients which have been established before a 1 bit is transferred have respective appropriate values or not based on an output signal from said step of effecting waveform equalization, an output signal from said step of generating ideal waveform-equalized data, and tap output signals from said transversal filter; and outputting address signals of said memory means as said coefficient control signal depending an output signal from said step of determining to enable said memory means to generate new tap coefficients.

10. A method according to claim 9, wherein said step of determining determines whether said tap coefficients have said respective appropriate values or not depending on H[i] expressed by the following equation:

$$H[i] = \sum_{k=1}^{K} -2Pb[k-1] \cdot (b[k] - Y[k])$$

where k is the time sequence number of the signal converted from an analog form into a digital form, i is the tap sequence number of said transversal filter, Pb[k] is an input value of said transversal filter, b[k] is a value of said ideal waveform-equalized data, and Y[k] is an output value of said transversal filter.

* * * * *